Dec. 21, 1948. W. H. COOPER 2,456,623
HYDRAULIC CYLINDER AND PACKING HOLDER
Filed Dec. 3, 1946

INVENTOR.
William H. Cooper
BY Wade Koontz
Frederick W. Cotterman
ATTORNEYS

Patented Dec. 21, 1948

2,456,623

UNITED STATES PATENT OFFICE 2,456,623

HYDRAULIC CYLINDER AND PACKING HOLDER

William H. Cooper, Atlanta, Ga.

Application December 3, 1946, Serial No. 713,727

4 Claims. (Cl. 286—35)

(Granted under the act of March 3, 1883, as amended April 30, 1928; 370 O. G. 757)

The invention described may be manufactured and used by or for the Government for governmental purposes without payment to me of any royalty thereon.

This invention relates to hydraulic cylinders and packing rings therefor and particularly to an improved holder for said packing rings.

The hydraulic packing rings in common use are generally contained in an internal annular recess at the open end of a hydraulic cylinder and when worn, packing rings of this kind must be removed and replaced, they must be picked out, one ring at a time, which is accomplished with considerable difficulty. Moreover, great care must be exercised in fishing out the packing rings to prevent scratching the polished surfaces of the ram and cylinder and to prevent damage to the new packing rings which are being installed.

It is therefore an object of the invention to slightly modify the cylinder, then provide a removable holder which will contain the packing rings and by which they may be removed as a unit.

It is another object to provide adjustable means by which the pressure on the packing rings may be varied as desired.

Another object is to so construct the holder that compensation may be made for packing rings of varying thickness.

Figure 1:
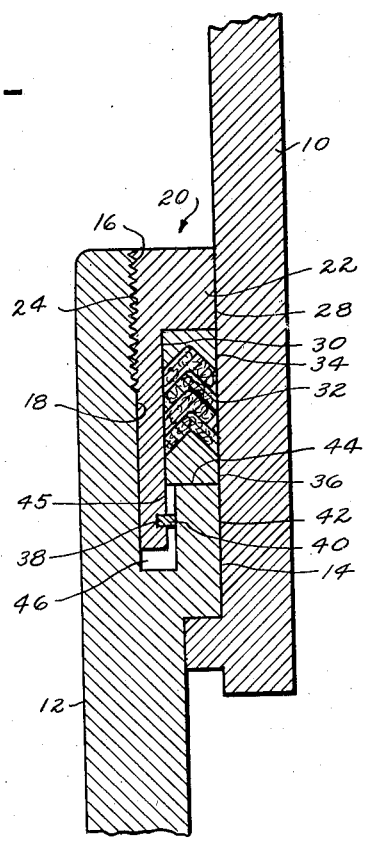

Other objects and advantages will be evident from a consideration of the following detailed description taken in conjunction with the drawings, wherein, Fig. 1 is an axial section through a typical installation of the improved packing rings and holder when assembled with a hydraulic ram and cylinder.

Figure 2:
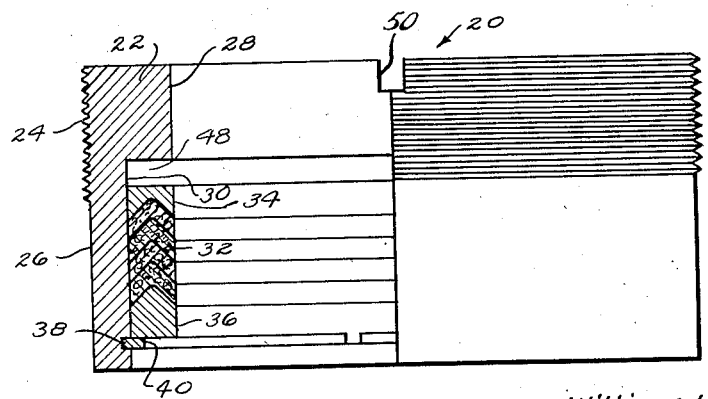

Fig. 2 is an axial section through the packing rings and holder after removal from the cylinder.

Like reference characters refer to like parts throughout the several views.

Referring now to the drawing, a hydraulic ram 10 is slidably fitted to the bore 14 of a hydraulic cylinder 12. The top of the hydraulic cylinder 12 is internally threaded at 16 and counterbored at 18 to receive the packing and holder assembly 20, Fig. 2, which is made in accordance with this invention.

The packing and holder assembly 20 consists principally of a cylindrical housing 22 externally threaded at 24 to fit the internal threads 16 of the cylinder 12 and externally machined at 26 to fit the counterbore 18 of the hydraulic cylinder 12.

Internally the housing 22 is bored at 28 to fit the ram 10 freely, counterbored from below at 30 to contain the packing rings 32 and packing supporting rings 34 and 36, and internally grooved at 38 for the spring snap ring 40. An upwardly extending concentric annular hub 42 provides a seat 44 upon which the lower packing supporting ring 36 may rest, the hub 42 being surrounded by an annular chamber 46 into which the lower end of the housing 22 extends.

It is noted that, in the assembly Fig. 1, the spring snap ring 40 is located well below the seat 44 upon which the lower packing supporting ring 36 rests, leaving a space 45 between the ring 38 and the seat 44, whereby a considerable raising of the packing housing 22 must occur before the snap ring 40 engages and begins to withdraw the packing rings 32 and packing supporting rings 34 and 36.

When the snap ring 40 engages and withdraws the rings 32, 34, and 36 (see Fig. 2) the space 45 will have been taken up, but there will be a space 48 equal in height to the space 45 between the ring 34 and the packing housing 22. This construction has a considerable advantage, in that if new packings are being installed and they are slightly thicker than normal, the only result will be that some of the space 48 will be taken up.

It is also noted that the annular chamber 46 has been made considerably deeper than the lower end of the packing housing 22. This is also an advantage, for if the packings come slightly thinner than normal, the space which is left in the bottom of the annular chamber 46 will permit the packing housing to be screwed down farther until the packing is sufficiently compressed.

Spanner wrench grooves 50 are provided for tightening the holder 20.

The device shown has a number of advantages. It permits considerable variation in the thickness of the packing rings without ill effect. It permits a considerable range of adjustment of the pressure under which the packing rings are held. It affords a means of extracting the packings and support rings in a body thus doing away with the necessity of fishing them out one at a time. It reduces the liability of scratching the polished metal surfaces of the hydraulic ram and cylinder. It reduces the liability of injury to new packings which are being installed. It reduces the time required for removal and installation of new packings. It permits the assembly of the packings and supporting rings prior to their installation and extracts them from the cylinder when desired.

It is noted that the ram 10, as well as the packing rings 32 and packing supporting rings 34 and 36, are conventional and included in the claims only inferentially. The packing housing and spring ring assembly 20, i. e., the packing holder, however, is believed to be broadly new, but is claimed in combination with the hydraulic cylinder 12 since the cylinder is necessarily modified to accommodate the packing holder.

Having this view of the scope of the invention, I claim:

1. A packing holder which comprises a cylindrical packing housing, an externally threaded portion at the upper end of said housing, a housing bore within said housing adapted to receive a hydraulic ram, a housing counterbore concentric with said housing bore extending upwardly from the underside of the housing adapted to slidably receive a packing consisting of packing rings and packing supporting rings, an annular groove in said housing counterbore considerably below the lower end of said packing, and a spring snap ring in said annular groove; in combination with a hydraulic cylinder, a cylinder bore in said hydraulic cylinder adapted to slidably receive said hydraulic ram, a cylinder counterbore concentric with said cylinder bore extending downwardly from the upper side of said cylinder adapted to receive said housing, said cylinder counterbore extending to a considerably greater depth than the lower end of said housing, a hollow hub extending upwardly from the lower end of said cylinder counterbore to the underside of said packing to support said packing, the external diameter of said hub being less than the internal diameter of said snap ring, internal threads at the upper end of said cylinder counterbore adapted to receive the external threads at the upper end of said housing, whereby, when the packing housing is screwed into the cylinder, the packing rings are compressed, and when the packing housing is unscrewed from the cylinder, the packing rings are withdrawn with the housing, and spanner slots for screwing said external housing threads into said internal cylinder threads.

2. A packing holder which comprises a packing housing, a housing bore within said housing adapted to receive a hydraulic ram, a housing counterbore concentric with said housing bore extending upwardly from the underside of the housing adapted to slidably receive a packing, an annular groove in said housing counterbore below the lower end of said packing, and a spring snap ring in said annular groove; in combination with a hydraulic cylinder, a cylinder bore in said hydraulic cylinder adapted to slidably receive said hydraulic ram, a cylinder counterbore concentric with said cylinder bore extending downwardly from the upper side of said cylinder adapted to receive said housing, said cylinder counterbore extending to a greater depth than the lower end of said housing, a hollow hub extending upwardly from the lower end of said cylinder counterbore to the underside of said packing to support said packing, the external diameter of said hub being less than the internal diameter of said snap ring, whereby, when said housing is forced into said cylinder, said packing is compressed, and when said housing is withdrawn from said cylinder, said packing is withdrawn therewith, and means actuable to facilitate forcing said housing into said cylinder.

3. A packing holder which comprises a packing housing, a housing bore within said housing adapted to receive a hydraulic ram, a housing counterbore concentric with said housing bore extending upwardly from the underside of the housing adapted to slidably receive a packing, a removable stop in said housing counterbore below the lower end of said packing, to limit downward movement of said packing in said housing counterbore; in combination with a hydraulic cylinder, a cylinder bore in said hydraulic cylinder adapted to slidably receive said hydraulic ram, a cylinder counterbore concentric with said cylinder bore extending downwardly from the upper side of said cylinder adapted to receive said housing, said cylinder counterbore extending to a greater depth than the lower end of said housing, a hollow hub extending upwardly from the lower end of said cylinder counterbore to the underside of said packing to support said packing, the external diameter of said hub being less than the internal diameter of said removable stop, whereby, when said housing is forced into said cylinder, the packing is compressed, and when said housing is withdrawn from said cylinder, said packing is withdrawn therewith, and means actuable to facilitate forcing said housing into said cylinder.

4. A packing holder which comprises a packing housing, a housing bore within said housing adapted to receive a hydraulic ram, a housing counterbore concentric with said housing bore extending upwardly from the underside of the housing adapted to slidably receive a packing, a removable stop in said housing counterbore below the lower end of said packing, to limit downward movement of said packing in said housing counterbore; in combination with a hydraulic cylinder, a cylinder bore in said hydraulic cylinder adapted to slidably receive said hydraulic ram, a cylinder counterbore concentric with said cylinder bore extending downwardly from the upper side of said cylinder adapted to receive said housing, said cylinder counterbore extending to a greater depth than the lower end of said housing, supporting means extending upwardly from the lower end of said cylinder counterbore to the underside of said packing to support said packing, the external diameter of said supporting means being less than the internal diameter of said removable stop, whereby, when said housing is forced into said cylinder, said packing is compressed, and when said housing is withdrawn from said cylinder, said packing is withdrawn therewith, and means actuable to facilitate forcing said housing into said cylinder.

WILLIAM H. COOPER.

REFERENCES CITED

The following references are of record in the file of this patent:

UNITED STATES PATENTS

| Number | Name | Date |
| --- | --- | --- |
| 885,899 | Willard | Apr. 28, 1908 |
| 1,213,145 | Bartholomew | Jan. 23, 1917 |
| 1,491,992 | McCuen | Apr. 29, 1924 |
| 1,771,890 | Hubbard et al. | July 29, 1930 |
| 2,213,785 | Larson et al. | Sept. 5, 1940 |